Aug. 20, 1935. F. A. FURLONG 2,012,162

SAFETY DEVICE

Filed July 22, 1933

INVENTOR.
Francis A. Furlong
BY
ATTORNEY

Patented Aug. 20, 1935

2,012,162

UNITED STATES PATENT OFFICE 2,012,162

SAFETY DEVICE

Francis A. Furlong, Chicago, Ill., assignor to Autogas Corporation, Chicago, Ill., a corporation of Delaware Application July 22, 1933, Serial No. 681,687

4 Claims. (Cl. 158—99)

This invention relates to heating systems, and more particularly to the provision in such a system of novel means protecting the system against the fuel being turned on too quickly.

In heating systems having an on-and-off control, at times when not much heat is required the heating plant is sometimes off for long periods. At such times the plant cools off substantially, and since the draft through the heating plant depends on its temperature the circulation of air may almost stop. If then the control comes "on" again, it may happen that fuel is supplied more rapidly than the circulation of secondary air is reestablished, giving temporarily a mixture which is too rich.

It has accordingly been recognized that it is desirable to have the flow of fuel increase slowly to its maximum, giving time for the flow of secondary air to increase correspondingly. Special valves and other special devices have been used for this purpose, but add considerably to the cost of the system.

It is an object of the present invention to secure the desired delayed action in turning on the fuel by a rearrangement of the parts of a standard heating system; and preferably by changes in the usual pressure regulator for the fuel line, without adding appreciably to its cost. In one desirable arrangement, the pressure regulator is of the type in which a spring-pressed diaphragm or the like automatically closes the fuel line entirely when the heating plant is "off", and means (preferably of an adjustable type) is provided for preventing the sudden opening of the fuel passage through the regulator when the system is again turned "on".

In one form shown in the drawing, there is an adjustable capillary passage, formed for example by a loosely-fitting screw thread, through which air must pass to one side of the diaphragm before it can fully open the fuel passage. In another embodiment, there is such a passage through which the gaseous fuel must pass in order to act on the diaphragm. In either case the passage may be adjusted to give a very slow action of the regulator in completely re-opening the fuel passage therethrough to reestablish full combustion.

The above and other objects and features of the invention, including various novel combinations of the parts of the system, and various desirable particular constructions, will be apparent from the following description of the illustrative embodiments shown in the accompanying drawing, in which.

Figure 1:
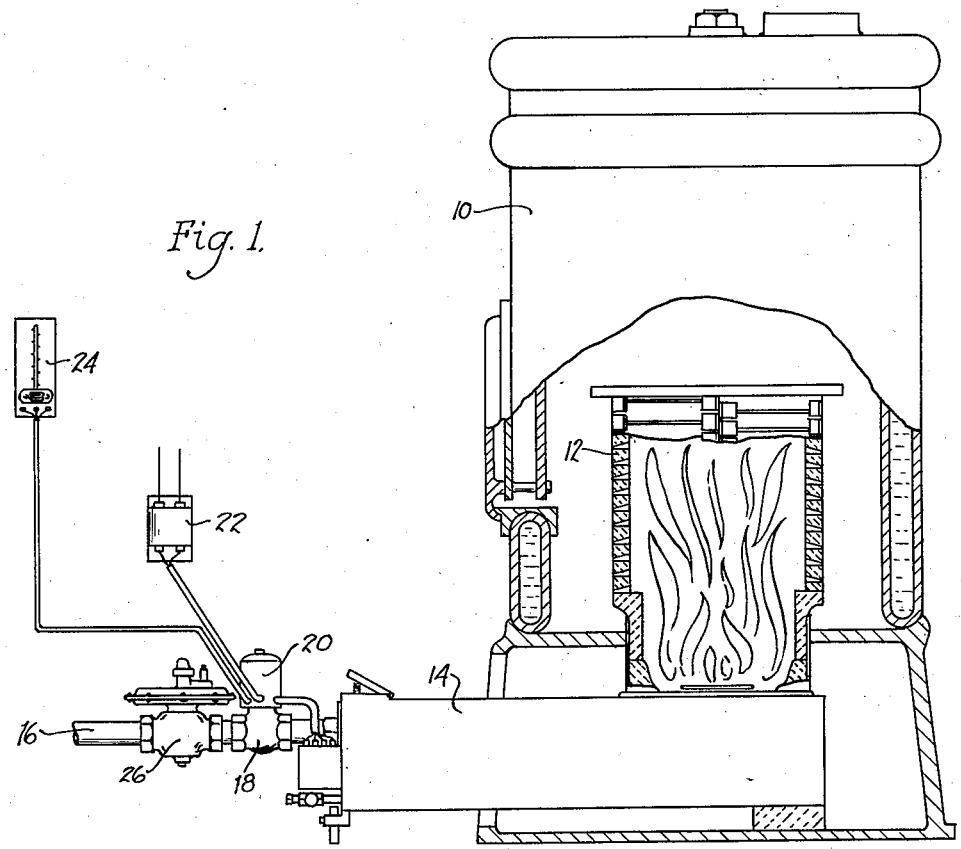
Figure 1 is a diagrammatic section through the heating plant.
Figure 2:
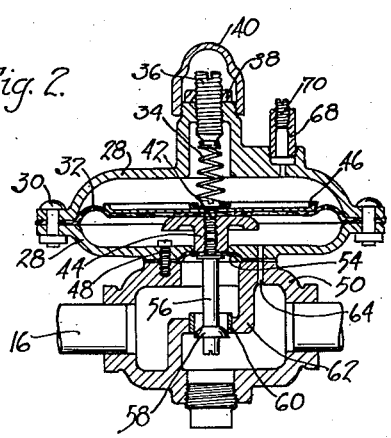
Figure 2 is a vertical section through the novel pressure regulating valve of Figure 1.

The heating system shown includes a hot water or steam boiler, or the like heating plant of any desired type, indicated at 10, and within which is a ceramic hollow-structure 12 adapted to be heated to incandescence and radiate heat to the heating plant. The structure 12 is shown supported on the inner end of a conversion burner having an elongated sheet steel box 14 extending through the front wall of the heating plant.

Fuel, in the form of gas, is supplied to the burner from a gas main 16 controlled by an "on-and-off" valve 18 operated by an electric motor device 20 connected through a transformer 22 to the house lighting circuit, and controlled by a room thermostat 24. The pressure of the gas reaching the valve 18 is controlled automatically by an automatic pressure regulator 26 arranged in series between the main 16 and the control valve 18.

Except as further described below, the above parts, and the parts associated therewith to make up the heating system, may be as fully described in my copending application No. 679,521 filed July 8, 1933.

The illustrated pressure regulator comprises a casing made in two parts 28, secured together by bolts or the like 30 with a diaphragm 32 between them. The diaphragm 32 is urged downwardly, to open the valve, by a spring 34 held by an adjustable setscrew 36 extending through the top of the casing. As the tension of the spring seldom has to be adjusted after the device is once installed, the setscrew 36 is preferably held by a locknut or the like 38 and is housed in a cap 40 threaded over it onto a boss on the top of the valve casing.

The center of the diaphragm 32 is connected, by a suitable fastening 42 to a plunger 44 which passes through the bottom of the casing. The fastening 42 also serves to hold in place a stamped metal disk 46 backing up the upper face of the diaphragm.

The above-described diaphragm casing is mounted, by machine screws 48 or the like, on the open top of a coupling member 50 threaded at its ends for connection to the fuel main 16 and the control valve 18. A sealing diaphragm 54 is arranged between the casing 28 and the coupling member 50, and is engaged by the lower end of the plunger 44, which is attached thereto by a stem 56 having its upper end threaded into the lower end of the plunger 44.

The stem 56 carries at its lower end a conical regulator valve member 58 arranged to cooperate with a vertical bushing or valve seat 60 pressed into an opening in a web 62 cast integrally across the coupling 50. A passage 64 connects the outlet or control valve side of the coupling 50 to the space in casing 28 below the diaphragm 32.

The operation of the structure so far described is to give an automatic regulation of the pressure of the fuel reaching the heating plant. If the control valve has been turned "off", the gas passes the web 62 and builds up a pressure on the far side thereof which, through passage 64, pushes upwardly on the diaphragm 32 until it overcomes the spring 34 and closes the valve 58. If now the control valve is opened, in response to a demand of the thermostat 24 for more heat, the upward pressure on the diaphragm 32 drops, opening the valve 58 until the pressure on the diaphragm balances the pressure of spring 34.

It is this opening of the regulator valve which, according to my invention, I control to give a slow or delayed opening, so that the supply of fuel increases slowly enough to correspond to the increasing flow of air as the circulation through the heating plant increases.

To this end, the upper half of the casing 28 has threaded thereinto, or otherwise secured thereto, a tubular nipple 68, preferably internally threaded to receive loosely an adjustable threaded plug 70. The plug 70 can be adjusted so that the flow of air past its threads is so restricted that downward movement of the diaphragm 32, upon a drop in the pressure below it, can only take place at the desired slow rate.

Figure 3:
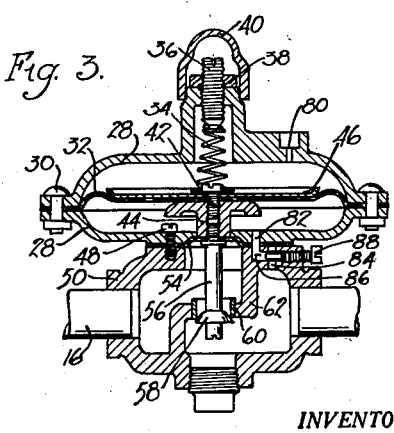
Figure 3 is a similar view of a modified construction.

In the modification of Figure 3, the upper half of the casing 28 is open freely to atmosphere through a passage 80. In this case, in lieu of a straight open passage 64 leading to the space below the diaphragm 32, I provide two passages 82 and 84 connected by a horizontal passage 86. The effective size of the passage 86 is adjustably controlled by a plug 88 fitting loosely therein and having its outer end tightly and adjustably threaded through the wall of the coupling 50.

In this case, upon a sudden drop in pressure on the control valve side of the regulator valve, the gas below the diaphragm is momentarily trapped, and can only pass slowly downward through the adjustable passage 88 to relieve the pressure on the diaphragm and allow the regulator valve 58 slowly to open.

While two illustrative embodiments have been described in detail, it is not my intention to limit the scope of the invention to those particular embodiments, or otherwise than by the terms of the appended claims.

I claim:

1. A heating system comprising a heating plant, a fuel main for supplying fuel thereto, an automatically-controlled on-and-off valve controlling the supply of fuel from said main to said plant, and a pressure-regulating valve forming a part of said main on the other side of said on-and-off valve from said plant, said pressure regulating valve comprising a casing containing a diaphragm dividing the casing into two chambers, a connection from one of the chambers of said casing to the fuel main side of the on-and-off valve whereby the diaphragm will be urged in one direction by the pressure of the fuel on the fuel main side of the on-and-off valve and a spring urging the diaphragm in the other direction, and also comprising, a valve closed by movement of the diaphragm in the said one direction and opened by movement thereof by said spring in said other direction, the chamber of the casing on the same side of the diaphragm as the spring having an adjustable throttling capillary passage there-through leading to the atmosphere.

2. A heating system comprising a heating plant, a fuel main for supplying fuel thereto, an automatically-controlled on-and-off valve controlling the supply of fuel from said main to said plant, and a pressure-regulating valve forming a part of said main on the other side of said on-and-off valve from said plant, said pressure regulating valve comprising a casing containing a diaphragm dividing the casing into two chambers, a connection from one of the chambers of said casing to the fuel main side of the on-and-off valve whereby the diaphragm will be urged in one direction by the pressure of the fuel between the regulating valve and the on-and-off valve and a spring urging the diaphragm in the other direction, and also comprising, a valve closed by movement of the diaphragm in the said one direction and opened by movement thereof by said spring in said other direction, the chamber of the casing on the opposite side of the diaphragm from the spring having an adjustable throttling capillary passage therethrough leading to the said gas on the heating plant side.

3. A heating system comprising a heating plant, a fuel main for supplying fuel thereto, an automatically controlled on and off valve controlling the supply of fuel from said main to said plant and a pressure regulating valve forming a part of said main on the side of said on and off valve opposite said plant, said pressure regulating valve comprising a casing containing a spring pressed diaphragm dividing it into two chambers, a connection from one chamber of said casing to the fuel main side of the on and off valve whereby the diaphragm will be controlled by the fuel pressure on the fuel main side of said valve, a valve in said main opened and closed by the diaphragm and a restricted passage through said casing throttling the change of pressure in one of said chambers.

4. A heating system comprising a heating plant, a fuel main for supplying fuel thereto, an on-and-off valve in the fuel main controlling the supply of fuel from said main to the heating plant, and a pressure regulating valve in said main on the side of the on-and-off valve remote from the heating plant, said pressure regulating valve comprising a casing, a diaphragm in the casing dividing the same into two chambers, a connection from one of said chambers to the fuel main between said valves, and means providing a restricted passage from the other chamber to the atmosphere and throttling the change of pressure on one side of the diaphragm.

FRANCIS A. FURLONG.